United States Patent
Libow et al.

(10) Patent No.: US 10,762,072 B2
(45) Date of Patent: Sep. 1, 2020

(54) PROCESSING MESSAGES OF A PLURALITY OF DEVICES

(71) Applicant: International Business Machines Corporation, Armonk, NY (US)

(72) Inventors: Eric B. Libow, Raleigh, NC (US); Markus Lorch, Dettenhausen (DE); Martin A. Oberhofer, Bondorf (DE); Torsten Steinbach, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 255 days.

(21) Appl. No.: 15/419,023

(22) Filed: Jan. 30, 2017

(65) Prior Publication Data
US 2018/0218019 A1    Aug. 2, 2018

(51) Int. Cl.
| G06F 16/22 | (2019.01) |
| G06F 16/84 | (2019.01) |
| H04L 12/28 | (2006.01) |
| H04L 12/58 | (2006.01) |

(52) U.S. Cl.
CPC .......... *G06F 16/2282* (2019.01); *G06F 16/86* (2019.01); *H04L 12/2823* (2013.01); *H04L 51/00* (2013.01)

(58) Field of Classification Search
CPC ......... G06F 17/30339; G06F 17/30917; G06F 17/30312; H04L 51/04; H04L 67/12
USPC ....................................................... 707/812
See application file for complete search history.

(56) References Cited

U.S. PATENT DOCUMENTS

| 8,990,212 B1* | 3/2015 | Zenger ............. G06F 17/30424 |
| | | 707/737 |
| 9,451,573 B2* | 9/2016 | Erickson ............... H04W 76/10 |
| 9,473,514 B1 | 10/2016 | Chou et al. |
| 2010/0088334 A1* | 4/2010 | Wasserman ....... G06F 17/30398 |
| | | 707/769 |

(Continued)

FOREIGN PATENT DOCUMENTS

CN    103312791 A    9/2013

OTHER PUBLICATIONS

"Schema matching", Wikipedia, the free encyclopedia, https://en.wikipedia.org/wiki/Schema_matching, retrieved from internet Dec. 2016, 4 pages.

(Continued)

*Primary Examiner* — Hosain T Alam
*Assistant Examiner* — Nicholas E Allen
(74) *Attorney, Agent, or Firm* — Reza Sarbakhsh; Edell, Shapiro & Finnan, LLC

(57) ABSTRACT

An embodiment of the invention pertains to processing messages received from a set of devices. A mapping of message fields to fact table columns is stored in a mapping table of a relational database. The method comprises, for each received message, determining all fields of the received message. If it is determined that the mapping table does not assign a fact table column to each of the determined fields of the message, a new mapping between message fields to respective fact table is automatically stored in the mapping table. A mapping is identified in the mapping table that assigns each of the determined fields of the message to a respective one of the columns of the fact table. The field values of the message are stored in the fact table in accordance with the identified mapping.

21 Claims, 4 Drawing Sheets

(56) References Cited

U.S. PATENT DOCUMENTS

| | | | | |
|---|---|---|---|---|
| 2010/0223262 | A1* | 9/2010 | Krylov | G06F 16/907 707/728 |
| 2012/0330869 | A1* | 12/2012 | Durham | G06N 5/022 706/16 |
| 2014/0074817 | A1* | 3/2014 | Neels | G06F 17/30424 707/711 |
| 2014/0244573 | A1* | 8/2014 | Gonsalves | G06F 17/30592 707/606 |
| 2014/0280151 | A1* | 9/2014 | Micaelian | G06F 16/2465 707/737 |
| 2015/0088885 | A1* | 3/2015 | Hopeman, IV | G06F 17/30315 707/737 |
| 2015/0095348 | A1* | 4/2015 | Presta | G06F 17/30958 707/748 |
| 2015/0113172 | A1* | 4/2015 | Johnson | H04L 67/34 709/245 |
| 2015/0199378 | A1* | 7/2015 | Reyntjens | G06N 5/00 707/754 |
| 2016/0050128 | A1* | 2/2016 | Schaible | H04L 67/12 709/218 |
| 2016/0087933 | A1* | 3/2016 | Johnson | H04W 4/70 709/245 |
| 2016/0098923 | A1* | 4/2016 | Patkar | G08C 23/04 398/106 |
| 2016/0162520 | A1* | 6/2016 | Zhang | G06F 17/30575 707/741 |
| 2016/0164728 | A1* | 6/2016 | Chakrabarti | H04L 63/029 370/254 |
| 2016/0195869 | A1* | 7/2016 | Sagemueller | G05B 19/402 700/195 |
| 2016/0217176 | A1* | 7/2016 | Haviv | G06F 3/0649 |
| 2016/0283745 | A1* | 9/2016 | LaFever | G06F 21/6254 |
| 2016/0285635 | A1* | 9/2016 | Kolesnikov | H04L 9/3226 |
| 2016/0285979 | A1 | 9/2016 | Wang et al. | |
| 2016/0292206 | A1* | 10/2016 | Ruiz Velazquez | G06F 16/2365 |
| 2016/0380807 | A1* | 12/2016 | Shevenell | H04L 41/082 370/252 |
| 2017/0006135 | A1* | 1/2017 | Siebel | H04L 67/02 |
| 2017/0011104 | A1* | 1/2017 | Hyde | G06F 16/211 |

OTHER PUBLICATIONS

"Message Processing", SAP Banner, https://help.hana.ondemand.com/iot/e577bf9fdaba439db2ca1fcdb4797 . . . , retrieved from Internet Dec. 2016, 7 pages.

"Process IoT Hub device-to-cloud messages using routes (.NET)", https://docs.microsoft.com/en-gb/azure/iot-hub/iot-hub-csharp-csharp- . . . , Dec. 12, 2016, 7 pages.

"How the AWS IoT Platform Works", https://aws.amazon.com/iot-platform/how-it-works/, retrieved from internet Dec. 2016, 4 pages.

Venkatesan et al., "Architectural Considerations for a Centralized Global IoT Platform", 2015 IEEE Region 10 Symposium, 2015, pp. 5-8.

Emeakaroha et al., "A Cloud-based IoT Data Gathering and Processing Platform", 2015 3rd International Conference on Future Internet of Things and Cloud, IEEE, 2015, pp. 50-57.

Ganz et al., "A Practical Evaluation of Information Processing and Abstraction Techniques for the Internet of Things", IEEE Internet of Things Journal, vol. 2, No. 4, Aug. 2015, pp. 340-354.

Fan et al., "A Scheme of Data Management in the Internet of Things", Proceedings of IC-NIDC2010, IEEE, 2010, pp. 110-114.

* cited by examiner

DB 160

Fact Table 118

| Time (302) | Dev.ID (303) | M.Type (304) | Int.1 (306) | Int.2 (308) | [...] | Float.1 (310) | Float.2 (312) | [...] | VarChar.1 (316) | VarChar.2 (318) | [...] |
|---|---|---|---|---|---|---|---|---|---|---|---|
| t1 | [...] | MSA | 312 | 34 | [...] | 0.03 | 14.2 | [...] | ready | #C0923 | [...] |
| t2 | [...] | MSB | 256 | 44 | [...] | 0.12 | 16.4 | [...] | ready | #CFF26 | [...] |
| t3 | [...] | MSB | 289 | 41 | [...] | 0.08 | 12.9 | [...] | error | #424AD | [...] |
| t4 | [...] | MSD | 278 | 39 | [...] | 0.08 | 13.6 | [...] | ready | #004DA | [...] |
| [...] | [...] | [...] | [...] | [...] | [...] | [...] | [...] | [...] | [...] | [...] | [...] |

Mapping Table 140.1

| M.Type (320) | Field (322) | Column (324) | [...] |
|---|---|---|---|
| MSA | temperature | Int.1 | [...] |
| MSA | moisture | Int.2 | [...] |
| MSA | accelX | Float.1 | [...] |
| MSA | accelY | Float.2 | [...] |
| MSA | accelZ | Float.3 | [...] |
| [...] | [...] | [...] | [...] |
| MSB | startLocat. | Int.1 | [...] |
| MSB | stopLocat. | Int.2 | [...] |
| MSB | startTime | Int.3 | [...] |
| MSB | maxYerk | Float.1 | [...] |
| [...] | [...] | [...] | [...] |

MSA-View 162.1
SELECT ft.Int.1 as „temperature", ft.Int.2 as „moisture", [...], ft.Float1 as „accelX", [...] FROM fact_table ft [...];

MSB-View 162.2
SELECT ft.Int.1 as „startLocat.", ft.Int.2 as „stopLocat.", ft.Int.3 as „startTime.", [...] ft.Float1 as „maxYerk", [...] FROM fact_table ft [...];

Device-Metadata Table 122

| Dev.Type (330) | Type-Nr (331) | M.Type (332) | Manufact. (334) |
|---|---|---|---|
| SE-A | 23523 | MSA | companyA |
| SE-B | 526533 | MSB | companyB |
| SE-C | 72341 | MSC | companyC |
| SE-D | 136674 | MSD | companyE |
| SE-E | 345111 | MSE | companyD |
| SE-F | 461855 | MSF | companyF |
| [...] | [...] | [...] | [...] |

Timestamp Table 120

| time (340) | Dev.ID (342) | [...] (344) |
|---|---|---|
| t5 | 23523 | [...] |
| t5 | 526533 | [...] |
| t9 | 23523 | [...] |
| t10 | 23523 | [...] |
| [...] | [...] | [...] |

Fact Table 118

| Time (302) | Dev.ID (303) | M.Type (304) | Int.1 (306) | Int.2 (308) | [...] | Float.1 (310) | Float.2 (312) | [...] | VarChar.1 (316) | VarChar.2 (318) | [...] |
|---|---|---|---|---|---|---|---|---|---|---|---|
| t1 | [...] | MSA | 312 | 34 | [...] | 0.03 | 14.2 | [...] | ready | #C0923 | [...] |
| t2 | [...] | MSB | 256 | 44 | [...] | 0.12 | 16.4 | [...] | ready | #CFF26 | [...] |
| t3 | [...] | MSB | 289 | 41 | [...] | 0.08 | 12.9 | [...] | error | #424AD | [...] |
| t4 | [...] | MSD | 278 | 39 | [...] | 0.08 | 13.6 | [...] | ready | #004DA | [...] |
| [...] | [...] | [...] | [...] | [...] | [...] | [...] | [...] | [...] | [...] | [...] | [...] |

Mapping Table 140.2

| M.Type (402) | Int1_field (404) | Int2_field (406) | Float1_field (408) | Float2_field (410) | Int3_field (412) | [...] |
|---|---|---|---|---|---|---|
| MSA | temperature | moisture | accelX | accelY | altitude | [...] |
| MSB | startLocat. | stopLocat. | moisture | Int.2 | startTime | [...] |
| [...] | [...] | [...] | [...] | [...] | [...] | [...] |

Device-Metadata Table 122

| Dev.Type (330) | Type-Nr (331) | M.Type (332) | Manufact. (334) |
|---|---|---|---|
| SE-A | 23523 | MSA | companyA |
| SE-B | 526533 | MSB | companyB |
| SE-C | 72341 | MSC | companyC |
| SE-D | 136674 | MSD | companyE |
| SE-E | 345111 | MSE | companyD |
| SE-F | 461855 | MSF | companyF |
| [...] | [...] | [...] | [...] |

MSA-View 162.1

MSB-View 162.2

Timestamp Table 120

Fig. 4

PROCESSING MESSAGES OF A PLURALITY OF DEVICES

BACKGROUND

1. Technical Field

Embodiments of the present invention relate to data processing, and more specifically, to the processing of messages received from a plurality of devices. The devices may be, for example, Internet of Things (IoT) devices.

2. Discussion of Related Art

In the IoT context, billions of devices may regularly send data to a central or distributed processing unit or system. The management and storage of the messages consumes lots of processing power and storage space. The data transfer to the data storage may be associated with high network traffic due to a bandwidth constrained network. Data analysis of the data provided by the devices over a prolonged period of time may be slow and consume lots of central processing unit (CPU) power due to the large volume of data. Any change in the message data format may require a manual rewriting of the program code and/or database table structures used for processing and storing the messages.

Thus, although IoT applications are used in many different fields ranging from industrial manufacturing to household electronic goods, the management and storage of the data produced by the IoT devices may be complex and consume lots of storage space, CPU capacity, and time of a database administrator.

SUMMARY

In one aspect, an invention embodiment relates to a computer-implemented method for processing messages received from a set of devices. The method comprises accessing a mapping table and a fact table. The mapping table and the fact table are stored in a relational database. The mapping table comprises mappings. Each mapping assigns message fields to columns of the fact table. For each of the received messages, a sub-method is executed. The sub-method comprises: determining all fields of the received message; analyzing the mapping table to determine whether the mapping table comprises a mapping that assigns each of the determined fields of the message to a respective one of the columns of the fact table; in response to determining that the mapping table does not comprise the mapping, automatically generating a new mapping, the new mapping assigning each of the determined fields of the message to a respective one of the columns of the fact table; storing the new mapping in the mapping table; identifying in the mapping table a mapping that assigns each of the determined fields of the message to a respective one of the columns of the fact table; and storing the field values of the message in the fact table in accordance with the assignment of fields to fact table columns of the identified mapping.

In a further aspect, an invention embodiment relates to a tangible non-volatile storage medium. The storage medium may comprise multiple connected storage media. The storage medium comprises computer-readable instructions which, when executed by a processor, cause the processor to perform a method for processing messages received from a set of devices. The method comprises accessing a mapping table and a fact table in a relational database, the mapping table comprising mappings, each mapping assigning message fields to columns of the fact table. For each of the received messages, the following sub-method is performed: determining all fields of the received message; analyzing the mapping table to determine whether the mapping table comprises a mapping that assigns each of the determined fields of the message to a respective one of the columns of the fact table; in response to determining that the mapping table does not comprise the mapping, automatically generating a new mapping, the new mapping assigning each of the determined fields of the message to a respective one of the columns of the fact table; and storing the new mapping in the mapping table; identifying in the mapping table a mapping that assigns each of the determined fields of the message to a respective one of the columns of the fact table; and storing the field values of the message in the fact table in accordance with the assignment of fields to fact table columns of the identified mapping.

In a further aspect, an invention embodiment relates to a system comprising a computer system. The computer system comprises a message processing application. The message processing application is operatively coupled to a relational database and to a set of devices via a network. The message processing application is configured for accessing a mapping table and a fact table in a relational database, wherein the mapping table comprises mappings, and wherein each mapping assigns message fields to columns of the fact table. The message processing application is further configured for performing, for each of the received messages, a sub-method comprising:
determining all fields of the received message;
analyzing the mapping table to determine whether the mapping table comprises a mapping that assigns each of the determined fields of the message to a respective one of the columns of the fact table;
in response to determining that the mapping table does not comprise the mapping, automatically generating a new mapping, the new mapping assigning each of the determined fields of the message to a respective one of the columns of the fact table; and storing the new mapping in the mapping table;
identifying in the mapping table a mapping that assigns each of the determined fields of the message to a respective one of the columns of the fact table; and
storing the field values of the message in the fact table in accordance with the assignment of fields to fact table columns of the identified mapping.

According to embodiments, the system further comprises the relational database and/or the set of devices.

According to embodiments, the messaging computer system is coupled to the client and the relational database via a network (e.g., the Internet).

Embodiments of the invention may be advantageous as structural elements of the fact table (e.g., individual columns) are dynamically mapped to particular fields of a message. Thus, it may be possible to store the messages of a plurality of different devices of a plurality of different device types into a single table. Individual fields such as temperature, pressure, moisture, acceleration in x-, y- and z-direction, altitude, recorded-voice-fields, or the like are not manually or invariably assigned to a particular column. Rather, a particular column may be assigned to different fields of different message types (e.g., submitted by devices of different device types). Thus, a condensed storage format is provided. This may significantly reduce storage consumption as the creation of a single, sparsely filled table comprising a respective column for each field of each of a plurality of device types is avoided. For example, the first column of a table having an INTEGER data type may be used for storing temperature data of a first device and for storing pressure data of another device. Thus, it is not necessary to create a table comprising two separate 'temperature' and 'pressure' columns respectively having an INTEGER data type.

Moreover, the maintainability, flexibility and extendibility of the system used for storing and maintaining the message data is greatly facilitated. For example, if a device of a new device type is added to the system, the system that receives and manages the messages automatically determines that no mapping exists for the message fields of the new device and automatically creates a new mapping of message field to table columns that will be used for storing the message data of the new device in the existing table. Thus, a manual adaptation of the data table used for storing the messages of multiple devices may not be necessary for integrating and storing messages of a new device type or a new device version. For example, if messages of a device of a new device type are to be processed and retrieved, it may not be necessary to create a new table for selectively storing the data of the new device type in the table.

BRIEF DESCRIPTION OF THE SEVERAL VIEWS OF THE DRAWINGS

In the following, embodiments of the invention are explained in greater detail, by way of example only, making reference to the drawings in which:

FIG. 3 depicts the structure of several tables and views according to an embodiment of the invention.

FIG. 4 depicts the structure of an alternative mapping table according to an embodiment of the invention.

DETAILED DESCRIPTION

Figure 1:
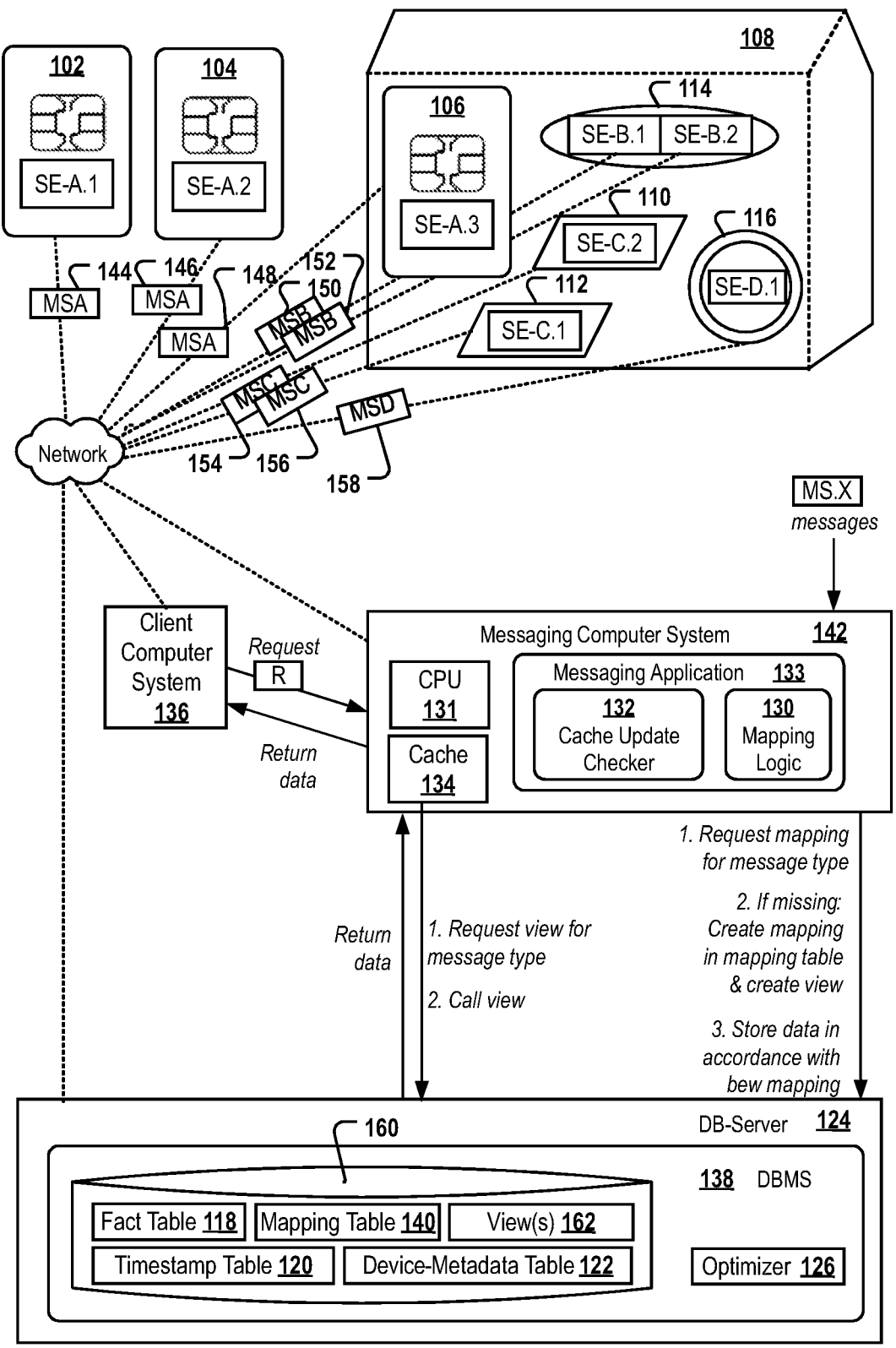
FIG. 1 depicts a distributed system comprising a messaging computer system, a database server and a plurality of IoT devices according to an embodiment of the invention.

According to embodiments, the method comprises: in response to determining that all determined fields are assigned to a column of the fact table by a mapping stored in the mapping table, reading the mapping. The method further comprises storing the field values of the message in the fact table columns indicated by the read mapping.

Thus, if a mapping for a particular set of message fields and a corresponding device type already exist, the assignment of message fields to fact table columns specified in the existing mapping is used to store field values in the fact table columns that are mapped in the mapping to the respective message fields. A plurality of messages of the same device type thus makes use of the same sub-set of columns of the fact table.

According to embodiments, the determining whether the mapping table comprises a mapping that assigns each of the determined fields of the message to a respective one of the columns of the fact table comprises: determining that the fact table comprises fewer columns than the number of fields comprised in the message; and automatically, in response to determining that the fact table comprises fewer columns than the number of fields comprised in the message, adding at least as many columns to the fact table as required for storing each field value of the received message in a respective column of the fact table.

For example, a new device of a particular device type may be added to a message processing system. The new device repeatedly sends messages comprising nine fields for various technical parameter values to the message processing system. When the message processing system receives the first message of the new device, the system may determine that the fact table comprises merely six columns. In this case, the message processing system may add as many additional columns as needed for storing each of the field values of the message in a respective column of the fact table. After having added the additional columns, the mapping table is updated by storing a new mapping in the mapping table that assigns each field of the new message to a respective fact table column.

Thus, the embodiment may fully automatically, without any intervention of a human operator, adapt the fact table structure and the content of the mapping table such that it may store messages of new devices and new message formats. Thus, a highly flexible, easily extensible message processing method may be provided.

According to embodiments, each of the fact table columns has assigned a column data type. The determining whether the mapping table comprises a mapping that assigns each of the determined fields of the message to a respective one of the columns of the fact table comprises accessing a configuration (e.g., a configuration table or a configuration file) for determining, for each of the fields of the received message, a data type to be used for storing the respective field value in the relational database. Alternatively, the field values of the message are analyzed for automatically determining, for each of the fields, a data type to be used for storing the respective field value. In addition, the method comprises determining that for at least one of the fields of the received message the fact table lacks a column having the data type that was determined to be used for storing the field value of the message field; and automatically, in response to the determination, adding at least as many columns having the required data type to the fact table as required for storing each field value of the received message in a respective fact table column having the data type determined for the field of the field value.

For example, a new device of a particular device type may be added to a message processing system. The new device repeatedly sends messages comprising three fields for 'temperature', 'pressure' and 'moisture' to the message processing system. When the message processing system receives the first message of the new device, the system may determine that the field values for temperature, pressure and moisture may all be fractional numbers that are to be stored in a fact table column of data type FLOAT. For example, a configuration file may assign each of the field names 'temperature', 'pressure' and 'moisture' to the data type FLOAT. However, the system may determine that the fact table comprises only two columns having the FLOAT data type. In this case, the message processing system may add an additional column with data type FLOAT to the fact table and store a new mapping in the mapping table that assigns each of the three fields of the new message type to one of the three FLOAT columns of the fact table. Thus, the fact table structure and the content of the mapping table may be adapted fully automatically such that it may store messages of new devices and new message formats and that a highly flexible, easily extensible message processing method may be provided.

According to embodiments, the identified mapping (used for appropriately storing the field values of the received message in the fact table) is the new mapping (that was created in response to receiving the message). Thus, upon receiving a message of a new format (a message comprising a new composition of fields), a new mapping of each of the message fields to respective fact table columns may be created and used for storing the field values fully automatically.

According to embodiments, the set of devices comprises more than one hundred, and preferably more than one thousand, devices. In some embodiments, the set of devices comprises more than one hundred thousand or even more than one million devices. Each of the devices may be configured to repeatedly send a message of a predefined, device-type-specific format (e.g., a set of fields) to a central message processing system.

According to embodiments, the set of devices comprises devices of different device types. The messages of devices of different device types comprise one or more different fields. Using the method for integrating a heterogeneous set of devices may be particularly advantageous as the same set of tables may be used for storing and analyzing data received from a plurality of devices belonging to a plurality of different device types. Thus, the method and the described set of tables may be robust against changes in the composition of device types which provide the received messages.

According to embodiments, each of the devices is configured to automatically and repeatedly submit messages directly or via a messaging system to a database management system (DBMS) that manages the relational database. For example, one or more first devices may be configured to send one message each second, one or more second devices may be configured to send one message each minute and other devices may be configured to send one message each hour. Any other time interval may be used, depending on the type of device or field value that is to be communicated. According to some examples, each message comprises a time stamp indicating the moment of creating the message, global positioning system (GPS) data or other spatial/geospatial data being indicative of the location of the device. One or more field values may indicate the state of the device or a measurement value measured by the device, environmental parameters, process parameters, health-related data of a user, etc. Each device may be a machine, a sensor, a vehicle, a product or product part, etc.

According to embodiments, the set of devices is a set of sensors. For example, the set of sensors may be integrated into a vehicle, a building, a machine, a production line, or a combination thereof. This may be advantageous as many currently existing IoT use case scenarios are implemented in the context of industrial manufacturing, home electronics, cars, etc.

According to embodiments, the messages have a human-readable format and comprise data in the form of field-name-field-value pairs. For example, the messages may be specified in JavaScript Object Notation (JSON) format or another American Standard Code for Information Interchange (ASCII) format. Using a machine-readable and human-readable message format may permit a user to easily check whether the structure of the content of the fact table and the content of the mapping table accurately represents the set of message fields to be stored in the database. Using a human-readable format may also ease implementing a message processing application program and implementing analytical routines which evaluate and process the data contained in the messages. The downside of human-readable message formats like ASCII is that such message formats consume much storage space. For example, if the message is stored in its original form, the field names may actually consume more storage and memory space than the respective field values. Embodiments of the invention may allow storing the field names of a particular message only in the mapping table. The field names of a message may be stored in association with a particular column of the fact table. Thus, the field names are stored only once for a particular message type and corresponding device type, and are not stored redundantly.

According to embodiments, the method further comprises computing a schema signature from all field-names of the fields of the received message. The determination of whether the mapping table comprises a mapping that assigns each of the determined fields of the message to a respective one of the columns of the fact table comprises checking whether the mapping table comprises a mapping having the computed signature. If the mapping lacks the computed signature, the mapping table is determined to lack a mapping that assigns each of the determined fields of the message to a respective one of the columns of the fact table. The newly created and stored mapping comprises the computed schema signature.

Computing a schema signature may have the advantage that only the signature value of a message needs to be compared with one or more reference signatures stored in the database. This may reduce CPU consumption as it may not be necessary to compare all field names of a received message with the totality of field names stored in the mapping table in order to determine whether a mapping for all field names in the received message already exists. For example, the schema signature may be computed as a hash of all field names of a message, whereby the field names are preferentially sorted in a predefined manner. Thus, a "schema signature" of a message is a data value that is a derivative of at least the field names of a message but which is independent of the field values specified in the message. The schema signature is identical for all messages having the same set of message fields. For example, all messages of the same device type may have the same schema signature. Thus, the schema signature may be characteristic of a particular device type or a particular device version.

According to embodiments, the method further comprises, for each of the devices: analyzing the totality of messages received from the device which have been stored in the fact table, wherein the analysis is performed for identifying one or more device-metadata columns, and wherein a device-metadata column is a fact table column whose field values are identical in all messages of the device; storing a copy of all device-metadata columns of the device in a device-metadata-table; and updating the mapping table by replacing, in the mapping of the message field names of the device, all metadata column names by respective column names of the device-metadata tables.

Automatically identifying device metadata columns and storing the metadata column in separate columns may further decrease memory and storage consumption as the redundant storing of invariable field values may be avoided. For example, in case a message comprises a field value for the device-name or the device-hardware model of the sender device, this name or hardware model will not change during the lifetime of a device. By automatically identifying a column (e.g. the device-name column) in the fact table which comprises multiple copies of only a single, invariable data value, and by storing the device-name (and invariable field values of further columns such as the device-hardware model) in a separate table, an "automated" normalization of the data content of multiple messages of multiple different message formats and corresponding device types may be achieved without any human intervention. Another example of a field that may comprise invariable field values is the 'location' attribute of stationary devices.

According to embodiments, the field names and field values in the message are string ASCII values which are parsed and automatically transformed into one or more different data formats supported by the DBMS that comprises the database before the field values are stored in the fact table. This data format may comprise, for example, INTEGER, FLOAT, BOOLEAN, VARCHAR, etc.

According to embodiments, the method further comprises, in response to determining that the mapping table does not comprise the mapping (e.g. because the received message is provided by a new device or device version): automatically generating a new view in the relational database, wherein the new view is configured to retrieve field values for the totality of fields in the received message from the fact table by selectively reading data values from the ones of the fact table columns which are mapped in the new mapping to the fields of the message. For example, the reading of the data values may be performed via an SQL SELECT statement.

Creating a view upon receiving the first message of a new device or device type may be advantageous as a client application may use the view for selectively reading and accessing messages provided from a particular device type although the fact table comprises a mixture of field values from a plurality of different device types. Thus, fine-granular access control of many different clients may be provided without revealing the whole complexity of the mapping table and the fact table to a client. Moreover, a device-type specific view configured for retrieving message data specifically for one or more devices of the device type may be created automatically. The client may be, for example, a message processing application or an analytical application that aggregates or otherwise processes the data in the fact table.

According to embodiments, the method further comprises receiving a request from a client system; the request relates to the retrieval of data of a plurality of messages of a particular one of the devices which has been stored in the fact table of the database.

In response to receiving the request, the method comprises identifying the view created for the device type of the one device and calling the identified view for extracting the message data that is stored in the fact table and that was received from the one device.

Alternatively, in response to receiving the request, the method comprises:
  analyzing the mapping table for identifying the fact table columns assigned to the message fields of the messages generated by the particular device;
  transforming the request into a database query adapted to selectively retrieve data values derived from messages of the particular device, the database query being configured to selectively access the identified fact table columns; and
  triggering the execution of the database query in the relational database.

For example, the transforming of the request may comprise calling the view that was created upon receiving the first message of a device of a particular device type. Alternatively, the transformation may comprise the generation of an SQL query that combines information in the fact table and the mapping table to identify the message data provided by the one particular device.

According to embodiments, the method comprises storing the received message in a software cache. The received message is stored as the most recent message received from a particular one of the devices. The method further comprises receiving a further message from the particular device; comparing the cached message and the further message for determining whether the field values of respective fields of all message fields of the two compared messages are identical; in response to determining that the compared field values are all identical, storing the current time as a time stamp in association with a device-ID of the particular device in a time stamp table instead of storing the field values of the further message to the fact table; and, in response to determining that the compared field values of at least one of the message fields are not identical, storing the further received message in the software cache as the most recent message received from a particular one of the devices.

This may be advantageous as the storage consumption of the database is reduced. For example, a sensor may measure a particular process parameter value or a particular environmental parameter, e.g. the temperature, once per minute. In most of the cases, the measured parameter may remain constant. Thus, the vast majority of measurements and corresponding messages which communicate the measurement values to a central message processing system may comprise the same data content. Storing all messages in the database consumes lots of storage space although the only information encoded in hundreds or thousands of messages is that the measured parameter has not changed at all. Simply reducing the measurement frequency of the devices may reduce storage consumption but may result in a system with a larger latency time as changes in an important parameter, e.g. the temperature, may be detected only with significant delay. By providing a method and corresponding program logic that caches at least the previous message of each of the devices and compares any further message of any of the devices with the cached message of the device, and by storing the message in the database only in case the content of the cached and the new message differ from each other, storage space may be saved without increasing the system latency and without reducing the information content of the database. As the current time (e.g., a time that is indicative of the time of receiving the further message and thus, implicitly, of the time of performing a measurement or generating the field values of the message) is stored in the database, any client application may reconstruct the field values communicated at the time stamp time simply by reading the field values of the particular device having been stored most recently in the fact table.

Preferably, the further received message is stored as a new cached message in the software cache only if it differs from the currently cached message of the same device by at least one field value (other than a time stamp that may be communicated as one of the field values of a message). Thus, the software cache is only updated if and only if for a particular data element, new information is added or updated.

Thus, the caching and comparing of received messages as described above may reduce storage consumption. Moreover, it may accelerate performance. In a further beneficial aspect, network traffic between the message processing system which receives the messages from the devices and the database server hosting the database may be reduced because only the time stamp information, not the complete message, is transferred from the message processing system to the database. Preferably, in response to storing the received message in the cache, all previous messages from the same device are removed from the software cache immediately.

In some embodiments, all messages are removed from the software cache after a predefined maximum time interval has passed since a message was stored in the cache. If a device stops sending messages, the last message of that device will also be purged from the software cache after the maximum time interval has lapsed as the device is deemed inactive.

According to embodiments, the software cache is managed by a program logic that receives and processes the messages of the set of devices before the messages are stored in the database. For example, the message processing logic may be instantiated on the same data processing machine that comprises the cache.

According to embodiments, the method comprises, in response to receiving a request for the data of all messages of a particular one of the devices over a time period, triggering the execution of an SQL query that combines information in the time stamp table and the fact table for reconstructing the field values of all messages received during the time period; and returning the reconstructed field values.

For instance, the time stamps may be stored in a time stamp table 'repeating_time stamps'. A view or a structured query language (SQL) statement that combines the repeating time stamps with the field values stored in the fact table may comprise the following SQL statement:
SELECT * from repeating_time stamps This would return the following result set (corresponding to the structure of the repeating_time stamps table):

| DEVICE_ID | MEASURE_TIME |
|---|---|
| 1 | 2016-12-20-11.37.23.276729 |
| 1 | 2016-12-20-11.38.22.573766 |
| 1 | 2016-12-20-11.39.28.452056 |
| 1 | 2016-12-20-11.46.57.404807 |

The following SQL statement would return the following result set (corresponding to the structure of the fact table):
select * from fact_table

| DEVICE_ID | MEASURE_TIME | VALUE1 | VALUE2 |
|---|---|---|---|
| 1 | 2016-12-20-11.37.23.276729 | 25 | 324 |
| 1 | 2016-12-20-11.46.57.404807 | 31 | 545 |

In the example above, the following SQL function would return the most recently stored measurement values in combination with the most recent time stamp (e.g., the current time) of receiving the further message from the device with device-ID "1":
CREATE OR REPLACE FUNCTION get_latest_measurement(device_id int, measure_time time stamp)
RETURNS TABLE (measure_time time stamp, value1 int, value2 int)
LANGUAGE SQL
BEGIN ATOMIC
RETURN
WITH latest_measurement(latest_measure_time) AS
(SELECT MAX(a.measure_time)
FROM repeating_time stamps a
WHERE a.device_id=get_latest_measurement. device_id
AND
a.measure_time<=get_latest_measurement.measure_time),
latest_measurement_with_changed_values(measure_time, value_change_time) AS
(SELECT MAX(b.latest_measure_time), MAX(a.measure_time)
FROM fact_table a, latest_measurement b
WHERE a.device_id=get_latest_measurement. device_id
AND a. measure_time<=b.latest_measure_time)
SELECT b.measure_time, a.value1, a.value2
FROM device_metrics a, latest_measurement_with_changed_values b
WHERE a.device_id=get_latest_measurement. device_id
AND
a. measure_time=b. value_change_time;
END An SQL query for retrieving the most recently stored field values of a device at a given time in the past would look like:
SELECT * from table(get_latest_measurement(1, '2016-12-20-11.46.47.780561')) as historic_measurement;

| MEASURE_TIME | VALUE1 | VALUE2 |
|---|---|---|
| 2016-12-20-11.37.23.276729 | 25 | 324 |

An SQL query for retrieving the most recently stored field values of a device for a current time would look like:
SELECT * from fact_table(get_latest_measurement(1, current time stamp)) as latest_measurement.

| MEASURE_TIME | VALUE1 | VALUE2 |
|---|---|---|
| 2016-12-20-11.46.57.404807 | 31 | 545 |

According to embodiments, the method is performed by a message processing application. The message processing application is adapted to receive the messages from the devices and to create at least the fact table and the mapping table. In addition, or alternatively, the message processing application is adapted to modify the structure and content of at least the fact table and the mapping table.

According to embodiments, the message processing application is configured to perform the message processing method described herein for embodiments and examples of the invention. The message processing application may be a stand-alone software application or an add-on or plug-in of a DBMS that manages the relational database comprising the fact table and the mapping table. Implementing the message processing method in a message processing application rather than the DBMS may have the advantage that the method is "DBMS agnostic". This means that the reduction of storage space and CPU consumption by densely storing field values based on a dynamically and fully automatically created field-to-column mapping may be applicable for many different DBMSs. It may not be necessary to use a special-purpose DBMS or to manually modify and extend the functionality of an existing DBMS in order to reduce storage, memory and CPU consumption for storing messages (e.g., in an IoT context).

According to embodiments, the message processing application is hosted on a messaging computer system. The messaging computer system is coupled to the client and the relational database via a network (e.g., the Internet). The messaging computer system may be, for instance, a standard computer system, a server system, a networked, distributed computer system or a cloud computer system.

According to embodiments, the message processing application is configured to use a defined portion of the main memory of the messaging computer system as a software cache for temporarily storing messages having been received previously from one or more of the devices.

According to embodiments, a DBMS that manages the relational database creates the fact table and the mapping table and stores the fact table and mapping table in the relational database. For example, the DBMS may be triggered by the message processing application or by a human operator to create the fact table and the mapping table.

According to embodiments, each of the fact table columns has assigned a column data type (e.g., FLOAT, INTEGER, VARCHAR, BOOLEAN, etc.). The storing of the field values comprises using, by the DBMS that manages the relational database, the data type of the fact table column for storing the field value to be stored in the column in a dense data format. For example, the field value 24.35° C. for the field 'temperature' is not stored as an ASCII string but rather as a FLOAT in the fact table. This may reduce storage consumption and may allow efficiently performing data aggregation tasks such as computing the average temperature over a vast number of temperature measurement values.

For example, in case the message would have been stored as JSON or Binary JSON (BSON) file or as ASCII message-field-value pairs, much more storage space would be consumed as not only the field values but also the field names would be stored and as field values encoded as ASCII character string consume more storage space than the same field value represented as INTEGER data type.

Preferably, the DBMS is a column oriented DBMS having built-in column based data compression algorithms. This may be advantageous as these built-in data compression algorithms typically are based on defined data formats (e.g., INTEGER, FLOAT, etc.). By storing field values in columns of an appropriate data type and by making use of existing built-in compression algorithms, a further reduction of storage consumption may be achieved that may not be used if the field values were stored in a row-oriented DBMS and/or would all be stored as ASCII values.

According to embodiments, each of the fact table columns has assigned a column data type. The method further comprises processing, by a DBMS that manages the relational database, a database on the field values of a plurality of messages stored in the fact table, the processing comprising loading a continuous sequential list of INTEGER field values stored in a FLOAT fact table column or FLOAT field values stored in a FLOAT fact table column into a CPU register; and performing the same type of CPU operation on each of the field values in the list without any intermitting CPU operation. An 'intermitting CPU operation' as used herein is an operation for representing an INTEGER or FLOAT data value as an ASCII character sequence or any other data structure of a 'higher' structural level or for parsing an ASCII character sequence or a 'higher level' data structure for extracting an INTEGER or FLOAT data value. Thus, an intermitting CPU operation relates to the conversion of data types rather than the actual mathematical processing of the data value (e.g., computing the sum, the mean, the average, the maximum, the minimum, etc.).

By storing the field values in DBMS supported data types like INTEGER and FLOAT, it may not only be possible to save storage space, but also to significantly accelerate the analytical processing of the messages and field values received from a large number of devices as the numbers to be aggregated and processed may be loaded and sequentially processed in the register without any delays caused by loading data and instruction for format conversion and parsing operations into the register. Thus, a real-time analytical processing of the data of thousands or even millions of devices may be possible. This may be highly advantageous in the context of an IoT application, in particular in a large scale industrial manufacturing IoT application context.

A "database" as used herein is an information structure which comprises one or more data containers, in particular database tables, the use of which is controlled by a DBMS. The database may be a relational database, a column-oriented database, an object oriented database, or any other kind of database. Accordingly, the DBMS may be a relational DBMS, a column oriented DBMS, an object oriented DBMS, an online analytical processing (OLAP) DBMS, an online transactional processing (OLTP) DBMS, or any other kind of DBMS. A DBMS may be optimized for quickly performing a particular kind of database query (e.g., OLTP queries or OLAP queries). The DBMS may be, for example, IBM DB2 for z/OS, Oracle, PostgreSQL, MySQL DBMS or the like. A "relational database" as used herein is a digital database whose organization is based on the relational model of data. The various software systems used to maintain relational databases are known as a relational database management system (RDBMS). Most relational database systems use SQL as the language for querying and maintaining the database.

A DBMS as used herein is a system designed to allow the definition, creation, querying, update, and administration of a database. A DBMS may be, for example, a row-oriented or column-oriented DBMS. According to embodiments, a DMBS is a system comprising one or more databases, a query planner and at least one interface for receiving queries from one or more client applications (e.g., a message processing application). The interface may be a standard SQL interface.

"Metadata" as used herein is data that is descriptive of some features of a device or device type. For example, metadata may comprise a version number of the device type, the name of the manufacturer, an ID of the device type, or the like.

A "network" as used herein may be any kind of wireless or wired information network. However, the network is such that it may be implemented to work in a telecommunication system, which is compliant with at least one of the following: TCP/IP, Ethernet, ATM, CDMA, GSM, HSCSD, GPRS, WCDMA, EDGE, Bluetooth, UMTS, WLAN and imode.

A "table" or "database table" as used herein is a collection of related data held in a structured format within a database. It includes columns and rows. It is a set of data elements (values) using a model of vertical columns (identifiable by name) and horizontal rows, the cell being the unit where a row and column intersect. A table may have some associated metadata (e.g., constraints on the table or on the values within particular columns, for example a constraint that any data value stored in a particular column must have a particular format, for instance FLOAT or INTEGER).

A "view" as used herein is a data structure maintained by a DBMS that may be accessed by database queries in the same way as database tables, but the data of views are calculated at query time.

A "device" as used herein may be any hardware object operable to generate a message that is actively or passively communicated to a message processing application. In particular, a device may be a sensor (i.e., a device that automatically measures parameter values for one or more parameters (e.g., temperature, altitude, acceleration in a particular direction, GPS location, etc.)).

A "processor register" or "CPU register" as used herein is a quickly accessible location available to a digital processor's central processing unit (CPU). Registers usually comprise a small amount of fast storage, and are typically addressed by mechanisms other than main memory, but may in some cases be memory mapped. When the CPU(s) process data (e.g., data stored in the fact table), the data is loaded from a larger memory into registers where it is used for arithmetic operations and is manipulated or tested by machine instructions. Manipulated data is then often stored back to main memory, either by the same instruction or by a subsequent one. The processor registers are preferably at the top of the memory hierarchy, and provide the fastest way to access data.

A "client" as used herein is a data processing system configured to request and/or access the relational database, either directly or via the message processing application. A client may be, for example, a desktop computer system, a notebook, a smartphone, a tablet computer or the like. The client may perform some analytical tasks by calling a view to retrieve message data provided by a particular device.

A "cache" or "software cache" as used herein is a logical data container whose size and content is managed by a software application (e.g., a messaging application). The software cache is an intermediate component between the messaging application and the database that stores messages in the form of one or more tables. The messaging application stores one or more messages that were most recently received from the device(s) and/or stores the one or more messages that were recently retrieved from the database in the software cache (i.e., a part of the main memory). The messaging system may use the cached messages for responding to requests to one or more clients instead of retrieving requested messages from the database. This may increase performance as the messaging system does not have to wait for the database to retrieve these frequently accessed latest messages for a particular device. In addition, or alternatively, the messaging application uses the software cache to determine whether a message that was currently received from a particular device provides new information or corresponds to a cached message of the same device that is known to have been stored in the database already. In this case, the storing of the current message in the database may be avoided. Thus, the software cache according to embodiments is not only used for increasing performance of message retrieval from a database, but is also used for reducing the amount of storage space consumed by the database.

A 'field' as used herein is a named parameter in a message that may have assigned a parameter value that is referred to herein as "field value". Preferably, all messages submitted by devices of a particular device type comprise the same set of parameters. Thus, the set of parameters of a message or a derivative value thereof (e.g., a hash value of the field names) may be used as a signature for the type of the device having provided a particular message.

The "internet of things" (IoT) as used herein is the interworking of physical devices (e.g., vehicles, buildings, and other items) and devices contained therein (e.g., in the vehicles, buildings and other items). The interworking of the devices is embedded with electronics, software, sensors, actuators, and network connectivity that enable these devices to collect and exchange data. The IoT allows objects to be sensed and/or controlled remotely across existing network infrastructure, creating opportunities for more direct integration of the physical world into computer-based systems, and resulting in improved efficiency, accuracy and economic benefit.

Possible combinations of the features described above may include the following aspects:

1. A computer-implemented method for processing messages received from a set of devices, the method comprising:
    accessing a mapping table and a fact table stored in a relational database, the mapping table comprising mappings, each mapping assigning message fields to columns of the fact table; and
    for each of the received messages:
    determining all fields of the received message;
    analyzing the mapping table to determine whether the mapping table comprises a mapping that assigns each of the determined fields of the message to respective ones of the columns of the fact table;
    in response to determining that the mapping table does not comprise the mapping that assigns each of the determined fields of the message to the respective ones of the columns of the fact table, automatically generating a new mapping, the new mapping assigning each of the determined fields of the message to the respective ones of the columns of the fact table, and storing the new mapping in the mapping table;
    identifying in the mapping table an identified mapping that assigns each of the determined fields of the message to the respective one of the columns of the fact table; and
    storing field values of the message in the fact table in accordance with the assignment of fields to fact table columns of the identified mapping.

2. The computer-implemented method of aspect 1, wherein analyzing the mapping table to determine whether the mapping table comprises the mapping that assigns each of the determined fields of the message to a respective one of the columns of the fact table comprises:
    determining that the fact table comprises fewer columns than a number of fields comprised in the message; and
    automatically, in response to the determination that the fact table comprises fewer columns than the number of fields comprised in the message, adding at least as many columns to the fact table as required for storing each field value of the received message in a respective column of the fact table.

3. The computer-implemented method of aspect 1, wherein each of the fact table columns have an assigned column data type, and wherein analyzing the mapping table to determine whether the mapping table comprises the mapping that assigns each of the determined fields of the message to the respective ones of the columns of the fact table comprises:
    accessing a configuration for determining, for each of the fields of the received message, a data type to be used for storing the respective field values in the relational database, or analyzing the field values of the message for automatically determining, for each of the fields, the data type to be used for storing the respective field value;
    determining that for at least one of the fields of the received message the fact table lacks a column having the data type that was determined to be used for storing the field value of the message field; and
    automatically, in response to the determination that for at least one of the fields of the received message the fact table lacks the column having the data type that was determined to be used for storing the field value of the message field, adding at least as many columns having the data type to the fact table as required for storing each field value of the received message in the respective ones of the columns of the fact table having the data type determined for the field of the field value.
4. The computer-implemented method of aspect 1, wherein the identified mapping is the new mapping.
5. The computer-implemented method of aspect 1, wherein the set of devices comprises more than one hundred devices.
6. The computer-implemented method of aspect 1, wherein the set of devices comprises devices of different device types, and wherein messages of devices of different device types comprises one or more different fields.
7. The computer-implemented method of aspect 1, wherein each of the devices is configured to automatically and repeatedly submit messages directly or via a messaging system to a database management system that manages the relational database.
8. The computer-implemented method of aspect 1, wherein the set of devices is a set of sensors integrated into a vehicle, a building, a machine, or a production line.
9. The computer-implemented method of aspect 1, wherein the received messages have a human-readable format and comprise data in the form of field-name-field-value pairs.
10. The computer-implemented method of aspect 9, further comprising:
computing a schema signature from all field-names of the fields of the received message, wherein:
the analyzing the mapping table to determine whether the mapping table comprises the mapping that assigns each of the determined fields of the message to respective ones of the columns of the fact table comprises checking whether the mapping table comprises a mapping having the computed signature;
the mapping is determined to lack the mapping that assigns each of the determined fields of the message to the respective ones of the columns of the fact table if the mapping lacks the computed signature; and
the new mapping comprising the computed schema signature.
11. The computer-implemented method of aspect 1, further comprising, for each of the devices:
analyzing a totality of the received messages to identify one or more device-metadata columns, wherein the one or more device-metadata columns are one or more of the fact table columns whose field values are identical for the totality of the received messages;
storing a copy of all of the one or more device-metadata columns in a device-metadata table; and
updating the mapping table by replacing, in the mappings assigning message fields to columns of the fact table, all metadata column names with respective column names of the device-metadata table.
12. The computer-implemented method of aspect 1, further comprising:
in response to determining that the mapping table does not comprise the mapping that assigns each of the determined fields of the message to the respective ones of the columns of the fact table, automatically generating a new view in the relational database, the new view being configured to retrieve field values for a totality of fields in the received message from the fact table by selectively reading data values from the fact table columns that are mapped in the new mapping to the determined fields of the received message.
13. The computer-implemented method of aspect 1, further comprising:
receiving a request from a client system, the request demanding retrieval of data of a plurality of messages of a device of the set devices;
analyzing the mapping table to identify the fact table columns that are assigned to the message fields of the plurality of messages;
transforming the request into a database query adapted to selectively retrieve data values provided by the plurality of messages, the database query being configured to selectively access the identified fact table columns; and
triggering an execution of the database query in the relational database.
14. The computer-implemented method of aspect 1, further comprising:
storing the received message in a software cache as a most recent message received from a device of the set of devices;
receiving a further message from the device;
comparing the received message and the further message to determine whether the field values of respective fields of all message fields of the received message and the further message are identical;
in response to determining that the field values are identical, storing a current time as a time stamp associated with a device-ID of the device in a time stamp table instead of storing the field values of the further message in the fact table; and
in response to determining that the field values of the respective fields of at least one of the message fields are not identical, storing the further message in the software cache as the most recent message received from the device of the set of the devices.
15. The computer-implemented method of aspect 14, further comprising:
in response to receiving a request for data of all messages of the device of the set of devices over a time period, triggering the execution of a structured query language query that combines information in the time stamp table and the fact table to reconstruct the field values of all messages received during the time period; and
returning the reconstructed field values.
16. The computer-implemented method of aspect 1, wherein the method is performed by a message processing application adapted to receive the messages from the devices and to create at least the fact table and the mapping table and/or to modify the structure and content of at least the fact table and the mapping table.
17. The computer-implemented method of aspect 16, wherein the message processing application is hosted on a messaging computer system that is coupled to a client and the relational database via a network.
18. The computer-implemented method of aspect 1, further comprising:
creating, via a database management system that manages the relational database, the fact table and the mapping table, and storing the fact table and mapping table in the relational database.
19. The computer-implemented method of aspect 1, wherein each of the fact table columns is assigned a column data type, and the storing of the field values comprising:
using, by a database management system that manages the relational database, the data type of the fact table column for storing the field value to be stored in a column in a dense data format.

20. The computer-implemented method of aspect 1, wherein each of the fact table columns is assigned a column data type, and the method further comprises:

processing, by a database management system that manages the relational database, a database on the field values of a plurality of messages stored in the fact table, the processing comprising loading a continuous sequential list of INTEGER field values stored in a FLOAT fact table column or FLOAT field values stored in a FLOAT fact table column into a central processing unit register; and performing a same type of central processing unit operation on each of the field values in the list without any intermitting central processing unit operation.

21. A tangible non-volatile storage medium comprising computer-readable instructions which, when executed by a processor, cause the processor to perform a method for processing messages received from a set of devices, the method comprising:

accessing a mapping table and a fact table in a relational database, the mapping table comprising mappings, each mapping assigning message fields to columns of the fact table; and for each of the received messages:
determining all fields of the received message;
analyzing the mapping table to determine whether the mapping table comprises a mapping that assigns each of the determined fields of the message to respective ones of the columns of the fact table;
in response to determining that the mapping table does not comprise the mapping that assigns each of the determined fields of the message to the respective ones of the columns of the fact table, automatically generating a new mapping, the new mapping assigning each of the determined fields of the message to the respective ones of the columns of the fact table, and storing the new mapping in the mapping table;
identifying in the mapping table an identified mapping that assigns each of the determined fields of the message to the respective one of the columns of the fact table; and
storing the field values of the message in the fact table in accordance with the assignment of fields to fact table columns of the identified mapping.

22. A system comprising a computer system, the computer system comprising a message processing application, the message processing application being operatively coupled to a relational database and to a set of devices via a network, the message processing application being configured for:

accessing a mapping table and a fact table in the relational database, the mapping table comprising mappings, each mapping assigning message fields to columns of the fact table; and for each of the received messages:
determining all fields of the received message;
analyzing the mapping table to determine whether the mapping table comprises a mapping that assigns each of the determined fields of the message to respective ones of the columns of the fact table;
in response to determining that the mapping table does not comprise the mapping that assigns each of the determined fields of the message to the respective ones of the columns of the fact table, automatically generating a new mapping, the new mapping assigning each of the determined fields of the message to the respective ones of the columns of the fact table, and storing the new mapping in the mapping table;
identifying in the mapping table an identified mapping that assigns each of the determined fields of the message to the respective one of the columns of the fact table; and
storing the field values of the message in the fact table in accordance with the assignment of fields to fact table columns of the identified mapping.

FIG. 1 depicts a distributed system comprising a messaging computer system 142, a database server 124 and a plurality of devices 102, 104, 106, 110, 112, 114, 116. The devices may be IoT devices. The devices may be stand-alone devices or embedded devices. In the depicted example, all devices are sensors. For example, devices 102, 104 and 106 are stand-alone devices of the same sensor type SE-A (e.g., thermometers) positioned at different locations outside of and inside of a house 108. The device 114 may comprise two sensors of the same sensor type SE-B. The house 108 comprises two further sensors 110, 112 of a further sensor type SE-C (e.g., a camera) and a further sensor 116 of sensor type SE-D (e.g. a microphone).

Each of the set of devices described above is able to send messages to a messaging computer system 142 via a network. For example, the network may be the internet or an intranet. Different communication standards and technologies may be used for sending the message from a sender device to the messaging computer system (e.g. Bluetooth, Ethernet connections, mobile, satellite based connections, the TCP/IP protocol, IPv6, e-mail, JSON messages, and the like). For example, device 102 sends a message 144 having message format MSA to the messaging computer system 142. Likewise, devices 104 and 106 send further messages 146, 148 having the same message format MSA to the computer 142. The three devices 102, 104, 106 share the same device type SE-A and thus have the same message format MSA. The "same message format" as used herein means that all messages having the same message format have the same set of message fields. The data values assigned to the fields in each message may vary. According to the system of FIG. 1, the sensors SE-B.1 and SE-B.2 comprising device 114 respectively send messages 150, 152 having message format MSB, sensors 110, 112 send messages 154, 156 having message format MSC and the sensor 116 sends a message 158 having message format MSD to the messaging computer system 142.

Each of the devices may repeatedly send messages at predefined time intervals and/or in response to a trigger event (e.g., a parameter change or a user action). The devices described above are only examples. The devices may likewise be any other device type selected from a wide variety of devices such as heart monitoring implants, biochip transponders, sensors which are built-in into a vehicle, DNA analysis devices for environmental/food/pathogen monitoring or field operation devices. The devices may likewise be "smart home devices" used for home security and home automation (e.g., the control and automation of lighting, heating, ventilation, air conditioning, and appliances such as washer/dryers, robotic vacuums, air purifiers, ovens or refrigerators/freezers that use Wi-Fi for remote monitoring). Likewise, the devices may comprise "smart wearable" devices, "smart home" devices, or devices relating to environmental monitoring and control or intelligent shopping systems monitoring specific users' purchasing habits in a store by tracking their specific mobile phones.

Thus, a large amount of data from diverse locations is collected and stored in a remote relational database 160 maintained by a DBMS 138 that is hosted on the database server 124. The message processing application 133 comprises a mapping logic 130 and optionally also a cache update checking functionality 132 for preprocessing the received messages MS.X in a way as to ensure that the CPU 131 and storage consumption at the side of the database server 124 is reduced.

The message processing application 133 is operatively coupled to the relational database 160 (i.e., it may access the database and read data that is stored in database tables, for example in the mapping table 140, the fact table 118 and optional further tables such as the time stamp table 120 and a device metadata table 122).

In addition, the message processing application 133 may modify the structure of at least the fact table 118, write new mappings in the mapping table 140, and optionally create views 162 or stored procedures in the database 160 for enabling easy access to device-type specific message data stored in the fact table 118.

The DBMS 138 comprises a query optimizer 126 for efficiently executing SQL queries (e.g., for analytical tasks) on data stored in the database 160.

The database 160 comprises a mapping table 140 comprising one or more "mappings". Each mapping assigns message fields of a particular device type and/or of a particular message format to columns of the fact table 118, as is depicted in FIGS. 3 and 4. Depending on the embodiment, each mapping may cover a single or multiple rows of the mapping table.

All, or at least the majority, of columns of the fact table do not represent a particular attribute such as 'temperature', 'location', 'acceleration' or the like. Rather, each column has a particular data format (e.g. INTEGER, VARCHAR, FLOAT, etc.). The assignment of fact table columns to attributes (e.g., fields in the messages received from the devices) is determined dynamically and is stored in the mapping table. Devices of different types have different sets of fields and thus the mapping of fields to fact table columns differs for each device type and, correspondingly, differs for each message format. Thus, a particular fact table column may have assigned different attributes (fields) and thus may store field values received from different device types and representing different parameters.

The devices 102, 104, 106, 110, 112, 114, 116 are configured to send the messages 144, 146, 148, 150, 152, 154, 156, 158 to the message processing application 133. The messaging application 133 processes the messages 144, 146, 148, 150, 152, 154, 156, 158 for storing the messages 144, 146, 148, 150, 152, 154, 156, 158 in the database 160 in a dense way that saves storage space and reduces network traffic. Optionally, the application 133 generates and stores views or other database structures or functions that ease and accelerate the analytical processing of the data stored in the fact table 118 by other applications (e.g., a client application hosted on a client computer system 136).

In the depicted embodiment, the message processing application 133 has access to a software cache 134 and stores, for each of the devices 102, 104, 106, 110, 112, 114, 116, the most recently received message in the software cache 134. Before the message processing application 133 starts storing a new received message in the database 160, the application 133 compares all field values of a currently received message with the field values of the message that was cached in software cache 134 for the particular device from which the current message was received. In case the compared messages are identical, the application 133 merely stores a current time stamp in the time stamp table 120 but does not store the complete message in the fact table. Only if the newly received message differs from the cached message is the newly received message stored in the fact table 118 and the cached message replaced by the newly received message in the cache. This avoids storing many messages in the database which actually comprise exactly the same field values as no measured parameter has changed. The message processing application is also able to receive requests R from client computers 136 and check whether a message needs to be returned that is not stored in the fact table 118 but rather is represented in the database 160 only by means of an entry in the time stamp table 120. In this case, the message processing application 133 reconstructs the requested message from the most recent fact table entry for the device of interest in the request R and from the time stamp table 120.

Figure 2:
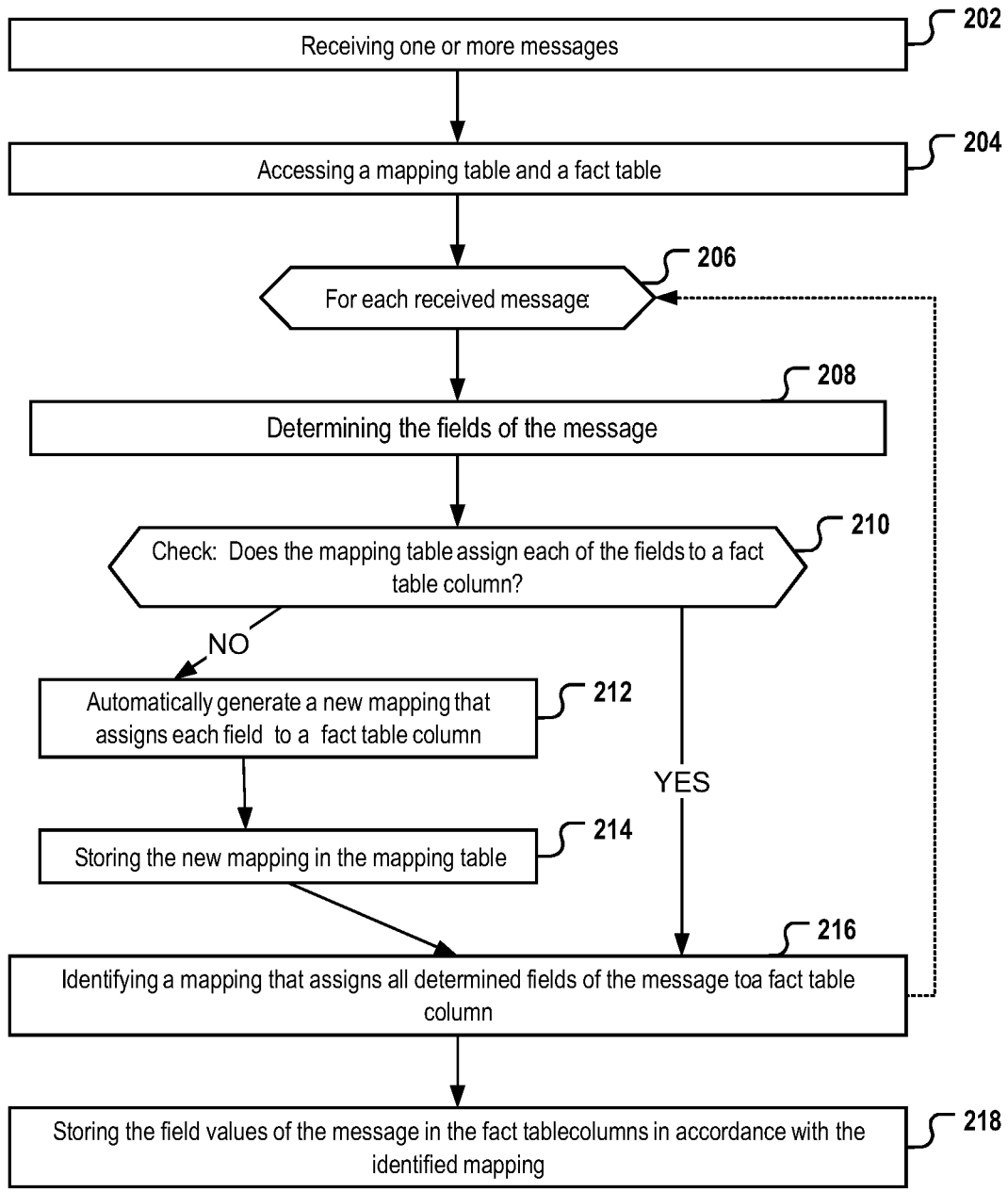
FIG. 2 depicts a flow chart of a method according to an embodiment of the invention.

FIG. 2 depicts a flow chart of a message processing method according to an embodiment of the invention. The method may be executed, for example, by the message processing application 133 depicted in FIG. 1. At block 202, the message processing application 133 receives one or more messages from the set of devices 102-116. In response to receiving the one or more messages, the messaging application 133 accesses at block 204 the mapping table 140 and the fact table 118. For each received message at block 206 of the one or more received messages, the following steps are performed: at a first block 208, the received message is analyzed for determining all fields of the received message. At block 210, the message processing application 133 accesses the mapping table 140 in order to determine whether the mapping table comprises a mapping that assigns each of the determined fields of the message to a respective one of the columns of the fact table 118.

If the determination at block 210 returns "TRUE", block 216 is performed and an already existing mapping in the mapping table is identified that assigns all determined fields of the message to a respective fact table column.

If the determination at block 210 returns "FALSE", block 212 is performed and a new mapping is generated automatically. The new mapping assigns each of the identified fields of the received message to one of the fact table columns. For example, the message application program 133 evaluates the field value and may automatically determine that the field value may be stored as a FLOAT or INTEGER and in this case identifies a column of the fact table having a suitable FLOAT or INTEGER data format. According to some embodiments, generating a new mapping at block 212 further comprises adding a new column to the mapping table. The new mapping table column assigns one field of the message having been determined not to be mapped to a respective one of the columns of the fact table 118 to the newly created fact table column. Then in step 214 the new mapping is stored in the mapping table 140. The mapping may cover one row of the mapping table or multiple rows of the mapping table. Block 216 is executed and the mapping in the mapping table, which was created and stored at block 214, is identified as a mapping that assigns all determined fields of the received message to a respective fact table column.

At block 218, the message processing application 133 stores the field values of the message in the fact table in accordance with the assignment of fields to fact table columns of the identified mapping.

Optionally, the method may comprise a block (not shown) for comparing the received message with a cached message that was stored in a software cache 134 and that represents the most recently received message from the same device from which the current message was received. If the two compared messages are identical, only the current time is stored in the time stamp table 120 without executing blocks 204 to 218.

FIG. 3 depicts the structure of several tables and views used according to an embodiment of the invention.

The fact table 118 comprises multiple rows and columns 302-318. Each row represents a data record and corresponds to and stores the data contained in a respective message. The time stamp column 302 stores the time stamp information of a message. The time stamp information may be the time when the message is generated by one of the devices 102-116 or the time when the message is received by the message processing application 133. The fact table 118 also includes a Dev.ID column 303. The message type column 304 comprises information on the message format (and thus, implicitly, the number and kind of fields in the message and the device type of the device having generated the message). Instead of or in addition to the "message format" column, a "device type" column may likewise be used. The fact table further comprises one or more columns 306, 308 having an INTEGER data format, one or more columns 310, 312 having FLOAT data format, and one or more further columns 316, 318 having a further data format (e.g., VARCHAR, BOOLEAN, etc.). In some embodiments, the fact table 118 is created by the message processing system or by a human operator with a minimum set of columns comprising only the time stamp and the message format/device type column and optionally one or more further columns for various data formats supported by the DBMS. The fact table 118 is then dynamically supplemented with additional columns in response to the message processing application 133 receiving a message that comprises more fields than suitable columns 306-318 for storing respective field values exist in the fact table. For example, in case the message processing application dynamically determines that a currently received message comprises three field values that should be stored in FLOAT data type but the fact table 118 comprises only two columns 310, 312 of the FLOAT data type, the message processing application adds a further FLOAT data type column to the fact table 118 and updates the mapping table 140.1 accordingly.

The mapping table 140.1 comprises multiple "mappings". In the depicted embodiment, each row of the mapping table 140.1 assigns a particular field of a particular message format (e.g. MSA) or device type (e.g. SE-A) to a respective column of the fact table. The totality of rows comprising "MSA" in column 320 represents the "mapping" of the fields of messages generated by devices of device type "SE-A" to respective columns in the fact table 118. For example, the field values of the field "temperature" of messages generated by any one of the devices 102-106 are stored, according to the assignment in the columns 322 and 324, in the first INTEGER column 306. Likewise, the field values of the field "moisture" of messages generated by any one of the devices 102-106 are stored in the second INTEGER column 308. It is important to note that a particular column of the fact table (e.g., column 306) is used for storing different values of different fields (attributes) of the messages of different device types. For example, column 306 is used for storing the temperature values specified in messages generated by devices of the SE-A type and for storing "start location" values specified in messages generated by devices of the SE-B type. The mapping is updated and supplemented with new field-to-fact-table-column assignments fully automatically by the message processing application 133 whenever the message processing application 133 receives a message of a "new" message format.

Thus, the structure of the fact table 118 and the content of the mapping table 140.1 are adapted dynamically and fully automatically to the message formats and fields of any device type integrated in the system. Thus, the system and method for processing messages described for embodiments of the invention may be universally applicable to all sensors and message types, may drastically reduce the consumed storage space in the database, may improve performance for analytical consumers of IoT data due to lower volumes of data to be processed and due to the use of DBMS-native data formats such as INTEGER and FLOAT.

In the following, two examples of messages specified in JSON format are provided whose field values do not exactly match the table content depicted in FIG. 3 but which give a better impression on the amount of storage that would be required if the message would be stored in its original JSON format or in the form of ASCII field-value pairs:

Message example 1:

```
Object{
"topic": "iot-2/type/iotsample-mbedlpc1768/id/0002f7f2034c/evt/status/fmt/json",
"payload": {
"d": {
"myName": "IoT mbed",
"accelX": -0.1875,
"accelY": 0.8908,
"accelZ": 0.1406,
"temp": 24.25,
"joystick": "CENTRE",
"potentiometer1": 0.8808,
"potentiometer2": 0.5565
}
},
"deviceId": "0002f7f2034c",
"deviceType": "iotsample-mbed-lpc1768",
"eventType": "status",
"format": "json",
"__msgid": "c95d3245.36a2d"
}
```

Message example 2:

```
Object{
"topic": "iot-2/type/accelerometerdevicetype/id/device-id/evt/status/rwz/json",
"payload": {
"d": {
"startTime": "20160303T103240",
"stopTime": "20160303T103245",
"startLocation": 24,
"stopLocation": 15,
"accelX": 1.53,
"axxelY": 1.67,
"maxJerk": 4.56,
[...]
"deviceUptime" : 234676,
"lastFault" : 0,
"lastFaultTime" : ""
}
"deviceId": "UHIWZH-F0-234RWKUG",
"deviceType": " UHIWZH-V1.1",
"eventType": "status",
"format": "json",
"__msgid": "f34e3245.465d4"
}
```

Each message of a particular device may comprise a device ID, device type, etc. These field values may automatically be identified by the message processing application as invariant metadata. The message processing application will automatically store field values of metadata attributes in a metadata table 122 only once for a particular device or device type instead of storing the field values in the fact table 118.

Upon first encounter of a new JSON message (unknown message signature), the message processing application 133 automatically creates a new mapping for the JSON field-value pairs in this message to fact table columns. The new mapping is stored in the form of one or more rows in the mapping table. All future encounters of a JSON message with the same signature will use this very same field mapping. For example, the mapping table may comprise a hash value generated from all field names of a particular message type (not shown). In response to receiving a new message, the message processing application computes a hash from the field names of the received message and compares the hash with the hash values stored in the mapping table 140.1 to determine whether a field-to-fact-table-column mapping exists for this message signature. If a particular new JSON message cannot be mapped to the existing fact table 118, additional columns are dynamically added to the fact table as described before. Besides device-id additional (configurable) attributes like for example message version may be used to calculate a unique signature.

According to embodiments, the message processing application is able to automatically identify a sub-set of columns of the fact table 118 that comprise invariable field values. For example, all messages having the data format MSA are derived from the device type SE-A having device-type number 23523 and being manufactured by "company A". In some embodiments, this information is stored in the fact table. In preferred embodiments, the message processing application 133 is configured to regularly check all data records of the fact table 118 and to automatically determine that, for example, in a minimum number of data records (e.g. one thousand) the values of the columns for "message type", "type number", and "manufacturer" did not change at all. In this case, the respective columns are identified as "metadata columns". After having identified one or more "metadata columns" in the fact table, the structure of the fact table 118 is modified by removing the metadata columns. A new metadata table 122 is created which comprises the removed metadata columns 330-334. Alternatively, the message processing application 133 modifies an existing metadata table and adds the metadata columns that were removed from the fact table or the data contained in the removed metadata columns to the existing metadata table.

According to the depicted embodiment, the message processing application 133 is further configured to create views 162.1, 162.2 for enabling easy access to the messages and respective field values having been stored in the fact table 118. As the fact table 118 is not based on a static assignment of columns and field values, retrieving device type specific data for analytical purposes may be difficult. By providing a view that combines information in the mapping table 140.1 and the fact table 118, clients may be enabled to easily retrieve and process field values of particular device types. For example, view 162.1 may be used to selectively retrieve message data generated by devices of device type SE-A and view 162.2 may be used to easily retrieve and process data generated by devices of device type SE-B. According to some embodiments, the message processing application is configured to receive a "view-request" for a particular device type (message format) from one or more client applications. In response to receiving a "view-request" for a particular device type, the message application generates a view that selectively retrieves messages of the particular device type upon being called.

In some embodiments, the message processing application 133 further comprises a cache update checker module 132 configured to compare a currently received message with the most recently received and cached message provided by the same device as the sender device of the currently received message. If the compared messages are identical, the update checker 132 merely stores the current time as a time stamp in a respective column 340 of a time stamp table 120 in association with a device-ID 342 in a time stamp table 120. In this example, the time stamp table 120 also includes another column 344. The newly received message and its field values are not stored in the database 160 in order to reduce storage consumption. The software cache 134 stores relevant messages in memory for improved access performance and for reducing the memory footprint of the computer system 142 by selectively replacing cached messages only in case a more current message was received from the same device which deviates from the cached message in at least one field value and by storing the currently received message in the fact table only in case the currently received message deviates from the message that was cached for the current sender device.

Maintaining and modifying the structure and content of the tables 118, 140.1, 122 may be performed, for example, by the mapping logic 130 of the message processing application 133. The adding of the views and the creation and maintenance of the time stamp table may be performed by the cache update checker 132.

In some embodiments, the mapping of message fields to "fact table columns" is defined on a per-device basis. This may be beneficial if there is only one device of a given device type contained in the system. Thus, in fact, the device-ID in this case also reflects the device type. In other embodiments, the mapping table 140.1 comprises assignments of fields to fact table columns on a per-device-type basis.

FIG. 4 depicts the structure of several tables and views used according to an alternative embodiment of the invention. The structure of the fact table 118, the metadata table 122 and of the views 162.1, 162.2 may correspond to the structure of the respective tables and views described already for FIG. 3. However, FIG. 4 depicts a mapping table 140.2 having a different structure than the mapping table 140.1 depicted in FIG. 3. In particular, the structure and the number of columns of the mapping table 140.1 is constant while the structure and number of columns of the mapping table 140.2 may vary in response to more devices being integrated in the system.

As described for FIG. 3, the fact table 118 comprises multiple rows and columns 302-318. Each row represents a data record and corresponds to and stores the data contained in a respective message. The time stamp column 302 stores the time stamp information of a message. In the mapping table 140.2, all details about a particular mapping (e.g., for the message format MSA and the corresponding device type SE-A) in one row of the mapping table. For this the mapping table has the same number of descriptive columns 402, 404, 406, 408, 410, 412 . . . as the fact table 118 has data columns. The descriptive column 324 of mapping table 140.1 as well as of mapping table 140.2 are preferentially of type VARCHAR. For each data column in the fact table 118 that is utilized in the specific mapping of the mapping table 140.2, the corresponding descriptive columns in the mapping table 140.2 has an entry, the unused columns have a NULL value in the mapping table 140.2.

While the mapping table 140.1 depicted in FIG. 3 may be instantiated with a predefined number of columns, the number of columns of the mapping table 140.2 may vary depending on the number and type of devices whose messages are to be stored in the fact table 118. For example, a new message is received by the messaging system. In order to store the data of the message in a condensed format that makes use of DBMS-supported data types, three INTEGER columns in the facts table 118 are required. However, the messaging application 133 may determine that only two INTEGER columns exist in the fact table (corresponding to a single line in the mapping table 140.2 comprising two columns 404, 406 assigning the message field "temperature" to the fact table column "Int1" 306 and the message field "moisture" to the fact table column "Int2" 308. In order to be able to store the newly received message, the messaging application 133 not only adds an additional, third INTEGER column Int3 to the fact table 118 (not shown) but also adds an additional column 412 in the mapping table 140.2 that assigns the message field "altitude" of the new message to the new Int3 column of the fact table 118.

The present invention may be a system, a method, and/or a computer program product. The computer program product may include a computer readable storage medium (or media) having computer readable program instructions thereon for causing a processor to carry out aspects of the present invention. The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

Aspects of embodiments are provided below.

1. A computer-implemented method for processing messages received from a set of devices, the method comprising:

accessing a mapping table and a fact table stored in a relational database, the mapping table comprising mappings, each mapping assigning message fields to columns of the fact table; and for each of the received messages:

determining all fields of the received message;

analyzing the mapping table to determine whether the mapping table comprises a mapping that assigns each of the determined fields of the message to respective ones of the columns of the fact table;

in response to determining that the mapping table does not comprise the mapping that assigns each of the determined fields of the message to the respective ones of the columns of the fact table, automatically generating a new mapping, the new mapping assigning each of the determined fields of the message to the respective ones of the columns of the fact table, and storing the new mapping in the mapping table;

identifying in the mapping table an identified mapping that assigns each of the determined fields of the message to the respective one of the columns of the fact table; and storing field values of the message in the fact table in accordance with the assignment of fields to fact table columns of the identified mapping.

2. The computer-implemented method of aspect 1, wherein analyzing the mapping table to determine whether the mapping table comprises the mapping that assigns each of the determined fields of the message to a respective one of the columns of the fact table comprises:

determining that the fact table comprises fewer columns than a number of fields comprised in the message; and automatically, in response to the determination that the fact table comprises fewer columns than the number of fields comprised in the message, adding at least as many columns to the fact table as required for storing each field value of the received message in a respective column of the fact table.

3. The computer-implemented method of aspect 1, wherein each of the fact table columns have an assigned column data type, and wherein analyzing the mapping table to determine whether the mapping table comprises the mapping that assigns each of the determined fields of the message to the respective ones of the columns of the fact table comprises:

accessing a configuration for determining, for each of the fields of the received message, a data type to be used for storing the respective field values in the relational database, or analyzing the field values of the message for automatically determining, for each of the fields, the data type to be used for storing the respective field value;

determining that for at least one of the fields of the received message the fact table lacks a column having the data type that was determined to be used for storing the field value of the message field; and automatically, in response to the determination that for at least one of the fields of the received message the fact table lacks the column having the data type that was determined to be used for storing the field value of the message field, adding at least as many columns having the data type to the fact table as required for storing each field value of the received message in the respective ones of the columns of the fact table having the data type determined for the field of the field value.

4. The computer-implemented method of aspect 1, wherein the identified mapping is the new mapping.

5. The computer-implemented method of aspect 1, wherein the set of devices comprises more than one hundred devices.

6. The computer-implemented method of aspect 1, wherein the set of devices comprises devices of different device types, and wherein messages of devices of different device types comprises one or more different fields.

7. The computer-implemented method of aspect 1, wherein each of the devices is configured to automatically and repeatedly submit messages directly or via a messaging system to a database management system that manages the relational database.

8. The computer-implemented method of aspect 1, wherein the set of devices is a set of sensors integrated into a vehicle, a building, a machine, or a production line.

9. The computer-implemented method of aspect 1, wherein the received messages have a human-readable format and comprise data in the form of field-name-field-value pairs.

10. The computer-implemented method of aspect 9, further comprising:

computing a schema signature from all field-names of the fields of the received message, wherein:

the analyzing the mapping table to determine whether the mapping table comprises the mapping that assigns each of the determined fields of the message to respective ones of the columns of the fact table comprises checking whether the mapping table comprises a mapping having the computed signature;

the mapping is determined to lack the mapping that assigns each of the determined fields of the message to the respective ones of the columns of the fact table if the mapping lacks the computed signature; and the new mapping comprising the computed schema signature.

11. The computer-implemented method of aspect 1, further comprising, for each of the devices:

analyzing a totality of the received messages to identify one or more device-metadata columns, wherein the one or more device-metadata columns are one or more of the fact table columns whose field values are identical for the totality of the received messages;

storing a copy of all of the one or more device-metadata columns in a device-metadata table; and updating the mapping table by replacing, in the mappings assigning message fields to columns of the fact table, all metadata column names with respective column names of the device-metadata table.

12. The computer-implemented method of aspect 1, further comprising:

in response to determining that the mapping table does not comprise the mapping that assigns each of the determined fields of the message to the respective ones of the columns of the fact table, automatically generating a new view in the relational database, the new view being configured to retrieve field values for a totality of fields in the received message from the fact table by selectively reading data values from the fact table columns that are mapped in the new mapping to the determined fields of the received message.

13. The computer-implemented method of aspect 1, further comprising:
   receiving a request from a client system, the request demanding retrieval of data of a plurality of messages of a device of the set devices;
   analyzing the mapping table to identify the fact table columns that are assigned to the message fields of the plurality of messages;
   transforming the request into a database query adapted to selectively retrieve data values provided by the plurality of messages, the database query being configured to selectively access the identified fact table columns; and
   triggering an execution of the database query in the relational database.

14. The computer-implemented method of aspect 1, further comprising:
   storing the received message in a software cache as a most recent message received from a device of the set of devices;
   receiving a further message from the device;
   comparing the received message and the further message to determine whether the field values of respective fields of all message fields of the received message and the further message are identical;
   in response to determining that the field values are identical, storing a current time as a time stamp associated with a device-ID of the device in a time stamp table instead of storing the field values of the further message in the fact table; and
   in response to determining that the field values of the respective fields of at least one of the message fields are not identical, storing the further message in the software cache as the most recent message received from the device of the set of the devices.

15. The computer-implemented method of aspect 14, further comprising:
   in response to receiving a request for data of all messages of the device of the set of devices over a time period, triggering the execution of a structured query language query that combines information in the time stamp table and the fact table to reconstruct the field values of all messages received during the time period; and
   returning the reconstructed field values.

16. The computer-implemented method of aspect 1, wherein the method is performed by a message processing application adapted to receive the messages from the devices and to create at least the fact table and the mapping table and/or to modify the structure and content of at least the fact table and the mapping table.

17. The computer-implemented method of aspect 16, wherein the message processing application is hosted on a messaging computer system that is coupled to a client and the relational database via a network.

18. The computer-implemented method of aspect 1, further comprising:
   creating, via a database management system that manages the relational database, the fact table and the mapping table, and storing the fact table and mapping table in the relational database.

19. The computer-implemented method of aspect 1, wherein each of the fact table columns is assigned a column data type, and the storing of the field values comprising:
   using, by a database management system that manages the relational database, the data type of the fact table column for storing the field value to be stored in a column in a dense data format.

20. The computer-implemented method of aspect 1, wherein each of the fact table columns is assigned a column data type, and the method further comprises:
   processing, by a database management system that manages the relational database, a database on the field values of a plurality of messages stored in the fact table, the processing comprising loading a continuous sequential list of INTEGER field values stored in a FLOAT fact table column or FLOAT field values stored in a FLOAT fact table column into a central processing unit register; and
   performing a same type of central processing unit operation on each of the field values in the list without any intermitting central processing unit operation.

21. A tangible non-volatile storage medium comprising computer-readable instructions which, when executed by a processor, cause the processor to perform a method for processing messages received from a set of devices, the method comprising:
   accessing a mapping table and a fact table in a relational database, the mapping table comprising mappings, each mapping assigning message fields to columns of the fact table; and
   for each of the received messages:
   determining all fields of the received message;
   analyzing the mapping table to determine whether the mapping table comprises a mapping that assigns each of the determined fields of the message to respective ones of the columns of the fact table;
   in response to determining that the mapping table does not comprise the mapping that assigns each of the determined fields of the message to the respective ones of the columns of the fact table, automatically generating a new mapping, the new mapping assigning each of the determined fields of the message to the respective ones of the columns of the fact table, and storing the new mapping in the mapping table;
   identifying in the mapping table an identified mapping that assigns each of the determined fields of the message to the respective one of the columns of the fact table; and
   storing the field values of the message in the fact table in accordance with the assignment of fields to fact table columns of the identified mapping.

22. A system comprising a computer system, the computer system comprising a message processing application, the message processing application being operatively coupled to a relational database and to a set of devices via a network, the message processing application being configured for:
   accessing a mapping table and a fact table in the relational database, the mapping table comprising mappings, each mapping assigning message fields to columns of the fact table; and
   for each of the received messages:
   determining all fields of the received message;
   analyzing the mapping table to determine whether the mapping table comprises a mapping that assigns each of the determined fields of the message to respective ones of the columns of the fact table;
   in response to determining that the mapping table does not comprise the mapping that assigns each of the determined fields of the message to the respective ones of the columns of the fact table, automatically generating a new mapping, the new mapping assigning each of the determined fields of the message to the respective ones of the columns of the fact table, and storing the new mapping in the mapping table;

identifying in the mapping table an identified mapping that assigns each of the determined fields of the message to the respective one of the columns of the fact table; and storing the field values of the message in the fact table in accordance with the assignment of fields to fact table columns of the identified mapping.

What is claimed is:

1. A computer-implemented method for processing messages received from a set of devices, the method comprising:
   accessing a mapping table and a fact table stored in a relational database, the mapping table comprising mappings, each mapping assigning message fields to columns of the fact table based on data formats of the message fields corresponding to data formats of the columns of the fact table, wherein the message fields represent a plurality of different types of parameters; and
   for each of the received messages:
      determining all fields of the received message;
      analyzing the mapping table to determine whether the mapping table comprises a mapping that assigns each of the determined fields of the message to respective ones of the columns of the fact table;
      in response to determining that the mapping table does not comprise the mapping that assigns each of the determined fields of the message to the respective ones of the columns of the fact table, automatically generating a new mapping, the new mapping assigning each of the determined fields of the message to the respective ones of the columns of the fact table, and storing the new mapping in the mapping table;
      identifying in the mapping table an identified mapping that assigns each of the determined fields of the message to the respective one of the columns of the fact table; and
      storing field values of the message in the fact table in accordance with the assignment of fields to fact table columns of the identified mapping, wherein one or more fact table columns each store values from at least two fields from messages of different device types, wherein the values from the at least two fields have a same data format and represent different types of parameters, and wherein a quantity of columns of the fact table is less than a quantity of the plurality of different types of parameters to be stored in the fact table.

2. The computer-implemented method of claim 1, wherein analyzing the mapping table to determine whether the mapping table comprises the mapping that assigns each of the determined fields of the message to a respective one of the columns of the fact table comprises:
   determining that the fact table comprises fewer columns of corresponding data formats than a number of fields comprised in the message; and
   automatically, in response to the determination that the fact table comprises fewer columns of corresponding data formats than the number of fields comprised in the message, adding at least as many columns to the fact table as required for storing each field value of the received message in a respective column of the fact table.

3. The computer-implemented method of claim 1, wherein each of the fact table columns have an assigned column data format, and wherein analyzing the mapping table to determine whether the mapping table comprises the mapping that assigns each of the determined fields of the message to the respective ones of the columns of the fact table comprises:
   determining, for each of the fields of the received message, a data format to be used for storing the respective field values in the relational database;
   determining that for at least one of the fields of the received message the fact table lacks a column having the data format that was determined to be used for storing the field value of the message field; and
   automatically, in response to the determination that for at least one of the fields of the received message the fact table lacks the column having the data format that was determined to be used for storing the field value of the message field, adding at least as many columns having the data format to the fact table as required for storing each field value of the received message in the respective ones of the columns of the fact table having the data format determined for the field of the field value.

4. The computer-implemented method of claim 1, wherein the identified mapping is the new mapping.

5. The computer-implemented method of claim 1, wherein the set of devices comprises networked devices.

6. The computer-implemented method of claim 1, wherein each of the devices is configured to automatically and repeatedly submit messages directly or via a messaging system to a database management system that manages the relational database.

7. The computer-implemented method of claim 1, wherein the set of devices is a set of sensors integrated into one of a vehicle, a building, a machine, and a production line.

8. The computer-implemented method of claim 1, wherein the received messages have a human-readable format and comprise data in the form of field-name-field-value pairs.

9. The computer-implemented method of claim 8, further comprising:
   computing a schema signature from all field-names of the fields of the received message, wherein:
      the analyzing the mapping table to determine whether the mapping table comprises the mapping that assigns each of the determined fields of the message to respective ones of the columns of the fact table comprises checking whether the mapping table comprises a mapping having the computed signature;
      the mapping is determined to lack the mapping that assigns each of the determined fields of the message to the respective ones of the columns of the fact table when the mapping lacks the computed signature; and
      the new mapping comprises the computed schema signature.

10. The computer-implemented method of claim 1, further comprising, for each of the devices:
   analyzing a totality of the received messages to identify one or more device-metadata columns, wherein the one or more device-metadata columns are one or more of the fact table columns whose field values are identical for the totality of the received messages;
   storing a copy of all of the one or more device-metadata columns in a device-metadata table; and
   updating the mapping table by replacing, in the mappings assigning message fields to columns of the fact table, all metadata column names with respective column names of the device-metadata table.

11. The computer-implemented method of claim 1, further comprising:

in response to determining that the mapping table does not comprise the mapping that assigns each of the determined fields of the message to the respective ones of the columns of the fact table, automatically generating a new view in the relational database, the new view being configured to retrieve field values for a totality of fields in the received message from the fact table by selectively reading data values from the fact table columns that are mapped in the new mapping to the determined fields of the received message.

12. The computer-implemented method of claim 1, further comprising:

receiving a request from a client system, the request demanding retrieval of data of a plurality of messages of a device of the set of devices;

analyzing the mapping table to identify the fact table columns that are assigned to the message fields of the plurality of messages;

transforming the request into a database query adapted to selectively retrieve data values provided by the plurality of messages, the database query being configured to selectively access the identified fact table columns; and triggering an execution of the database query in the relational database.

13. The computer-implemented method of claim 1, further comprising:

storing the received message in a software cache as a most recent message received from a device of the set of devices;

receiving a further message from the device;

comparing the received message and the further message to determine whether the field values of respective fields of all message fields of the received message and the further message are identical;

in response to determining that the field values are identical, storing a current time as a time stamp associated with a device-ID of the device in a time stamp table instead of storing the field values of the further message in the fact table; and in response to determining that the field values of the respective fields of at least one of the message fields are not identical, storing the further message in the software cache as the most recent message received from the device of the set of the devices.

14. The computer-implemented method of claim 13, further comprising:

in response to receiving a request for data of all messages of the device of the set of devices over a time period, triggering the execution of a structured query language query that combines information in the time stamp table and the fact table to reconstruct the field values of all messages received during the time period; and returning the reconstructed field values.

15. The computer-implemented method of claim 1, wherein the method is performed by a message processing application adapted to receive the messages from the devices and to perform one or more of: create at least the fact table and the mapping table, and modify the structure and content of at least the fact table and the mapping table.

16. The computer-implemented method of claim 15, wherein the message processing application is hosted on a messaging computer system that is coupled to a client and the relational database via a network.

17. The computer-implemented method of claim 1, further comprising:

creating, via a database management system that manages the relational database, the fact table and the mapping table, and storing the fact table and mapping table in the relational database.

18. The computer-implemented method of claim 1, wherein each of the fact table columns is assigned a column data format, and the storing of the field values comprising:

using, by a database management system that manages the relational database, the data format of the fact table column for storing the field value to be stored in a column in a dense data format.

19. The computer-implemented method of claim 1, wherein each of the fact table columns is assigned a column data format, and the method further comprises:

processing, by a database management system that manages the relational database, a database on the field values of a plurality of messages stored in the fact table, the processing comprising loading a continuous sequential list of INTEGER field values stored in a FLOAT fact table column or FLOAT field values stored in a FLOAT fact table column into a central processing unit register; and performing a same type of central processing unit operation on each of the field values in the list without any intermitting central processing unit operation.

20. A tangible non-volatile storage medium comprising computer- readable instructions which, when executed by a processor, cause the processor to perform a method for processing messages received from a set of devices, the method comprising:

accessing a mapping table and a fact table in a relational database, the mapping table comprising mappings, each mapping assigning message fields to columns of the fact table based on data formats of the message fields corresponding to data formats of the columns of the fact table, wherein the message fields represent a plurality of different types of parameters; and for each of the received messages:

determining all fields of the received message;

analyzing the mapping table to determine whether the mapping table comprises a mapping that assigns each of the determined fields of the message to respective ones of the columns of the fact table;

in response to determining that the mapping table does not comprise the mapping that assigns each of the determined fields of the message to the respective ones of the columns of the fact table, automatically generating a new mapping, the new mapping assigning each of the determined fields of the message to the respective ones of the columns of the fact table, and storing the new mapping in the mapping table;

identifying in the mapping table an identified mapping that assigns each of the determined fields of the message to the respective one of the columns of the fact table; and storing field values of the message in the fact table in accordance with the assignment of fields to fact table columns of the identified mapping, wherein one or more fact table columns each store values from at least two fields from messages of different device types, wherein the values from the at least two fields have a same data format and represent different types of parameters, and wherein a quantity of columns of the fact table is less than a quantity of the plurality of different types of parameters to be stored in the fact table.

21. A system comprising a computer system, the computer system comprising a message processing application, the message processing application being operatively coupled to a relational database and to a set of devices via a network, the message processing application being configured for:

accessing a mapping table and a fact table in the relational database, the mapping table comprising mappings, each mapping assigning message fields to columns of the fact table based on data formats of the message fields corresponding to data formats of the columns of the fact table, wherein the message fields represent a plurality of different types of parameters; and for each of the received messages:

determining all fields of the received message;

analyzing the mapping table to determine whether the mapping table comprises a mapping that assigns each of the determined fields of the message to respective ones of the columns of the fact table;

in response to determining that the mapping table does not comprise the mapping that assigns each of the determined fields of the message to the respective ones of the columns of the fact table, automatically generating a new mapping, the new mapping assigning each of the determined fields of the message to the respective ones of the columns of the fact table, and storing the new mapping in the mapping table;

identifying in the mapping table an identified mapping that assigns each of the determined fields of the message to the respective one of the columns of the fact table; and storing field values of the message in the fact table in accordance with the assignment of fields to fact table columns of the identified mapping, wherein one or more fact table columns each store values from at least two fields from messages of different device types, wherein the values from the at least two fields have a same data format and represent different types of parameters, and wherein a quantity of columns of the fact table is less than a quantity of the plurality of different types of parameters to be stored in the fact table.

* * * * *